Dec. 27, 1927.  
G. RIGGS  
TESTING SYSTEM  
Filed July 29, 1926

Inventor:  
George Riggs.  
by J.G.Roberts Att'y.

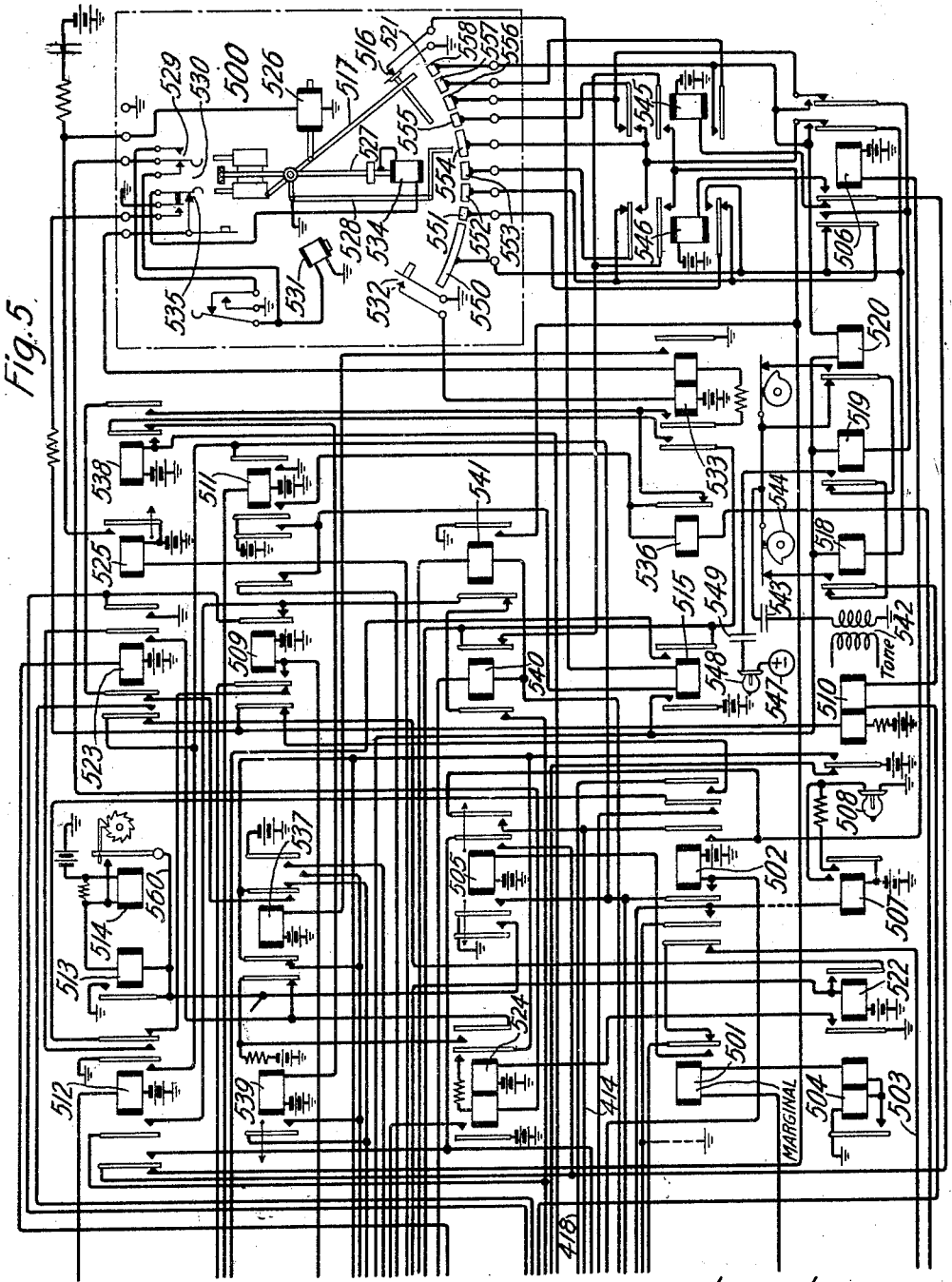

Patented Dec. 27, 1927.

1,653,782

UNITED STATES PATENT OFFICE.

GEORGE RIGGS, OF PORT WASHINGTON, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed July 29, 1926. Serial No. 125,602.

This invention relates to telephone exchange systems and particularly to testing equipment for automatic switching apparatus.

It is an object of the present invention to provide improved remote control for the substation testing equipment.

In the testing of the substation equipment of a subscriber in an automatic exchange, it has been customary heretofore to require the assistance of an operator in order to test the dial thereat. On the other hand the testing of the substation ringer has been accomplished customarily under remote control. This arrangement has resulted in considerable delay in completely testing substation apparatus.

Equipment for testing dials with the assistance of an operator is shown in an application of R. B. Miller, Serial No. 119,579, filed June 30, 1926, Patent No. 1,624,422, granted April 12, 1927; equipment for testing dials alone under remote control is shown in the application of Claude Ewing, Serial No. 132,825, filed August 31, 1926, Patent No. 1,621,480, granted March 15, 1927; apparatus for testing ringers under remote control is disclosed in an application of C. V. Taplin, Serial No. 723,804, filed July 2, 1924, Patent No. 1,586,587, granted June 1, 1926.

In accordance with the present invention, a test line for testing substation ringers is provided with variably operable equipment whereby a dial tester may be associated therewith. The circuits are likewise arranged to permit the release of the dial tester or the release of the test line followed by the release of the dial tester. In addition the dial tester is arranged to be associated with the subscriber's line either through the test line or through an operator's position.

In general, the above features may be embodied in an arrangement whereby a test line in a telephone office may be reached from the substation by the dialing of a particular number. This test line may be located before a district selector or before an office selector. It is provided with ringing equipment for applying ringing current to the line of the calling station of a character to test the operation of a substation ringer, and also with apparatus for enabling the association of the substation with the dial tester. The apparatus is likewise arranged to permit testing the substation ringer or the substation dial or the ringer and the dial successively.

The operation of such a system will be more clearly apparent from a consideration of the accompanying drawings in which:

Figs. 4 and 5 show a dial tester circuit including a switch for associating the tester circuit with either the test line or the test cord and a second switch for controlling the tester. The dial tester pendulum is shown at the right of Fig. 5.

Fig. 6 shows the manner of arranging Figs. 1 to 5.

Figure 1:
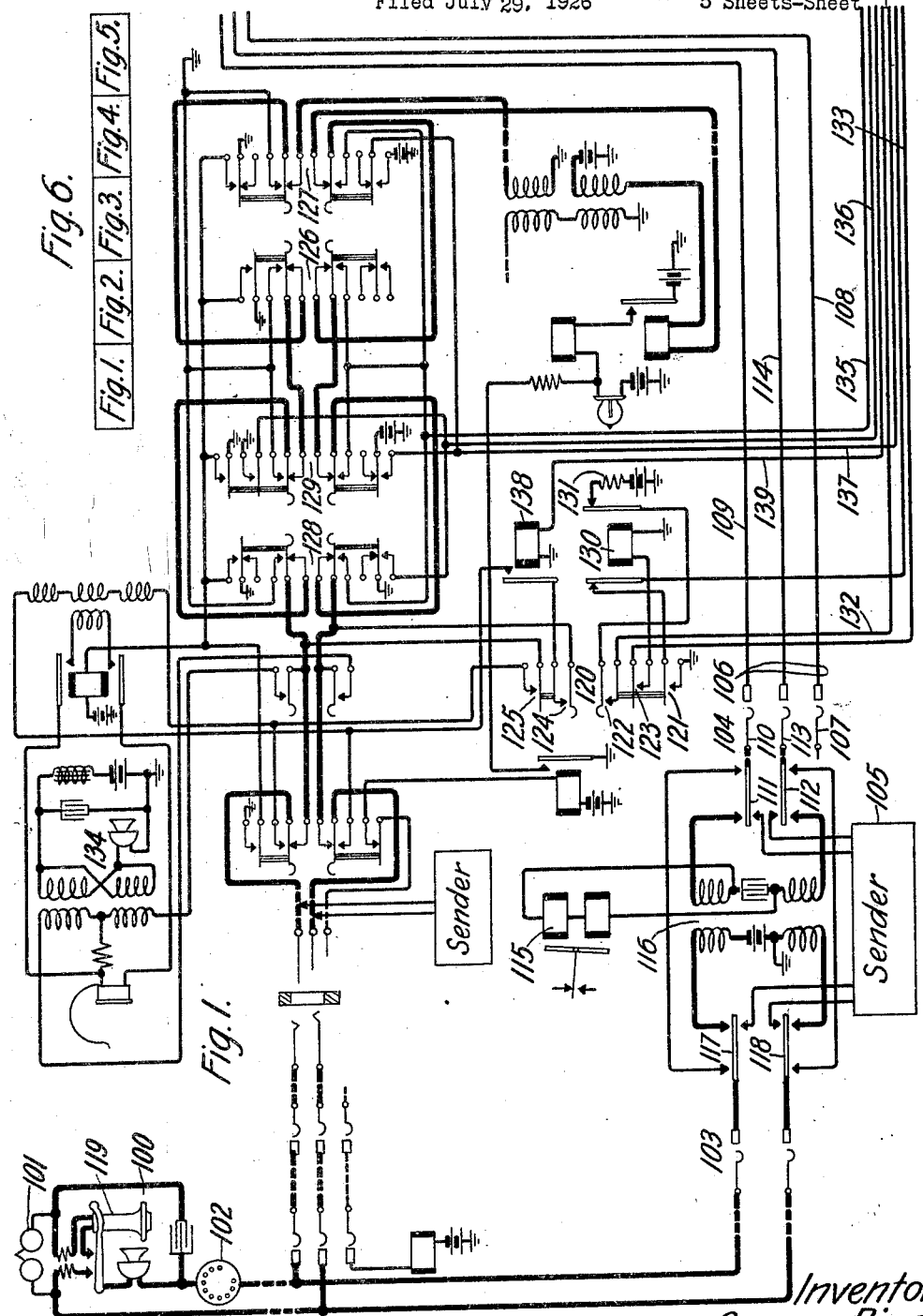
Fig. 1 shows a subscriber's substation together with automatic apparatus (indicated diagrammatically) and a cord circuit by means of which the substation may be connected with the test equipment.

The apparatuses used are all of well known types. The test cord, a portion of which is shown in Fig. 1, is disclosed in U. S. Patent to E. R. Lundius, 1,577,333, granted March 16, 1926. The line switch and district selector may well be of the type disclosed in U. S. Patent to F. A. Stearn et al., 1,395,977, granted November 1, 1921, although a line finder and district selector link, of any other well known type may be substituted therefor. The dial tester of Fig. 5 is shown in U. S. application of W. J. Booth and A. C. McGrath, Serial No. 745,030, filed October 21, 1924.

*Test of individual line operation of test line.*

Figure 2:
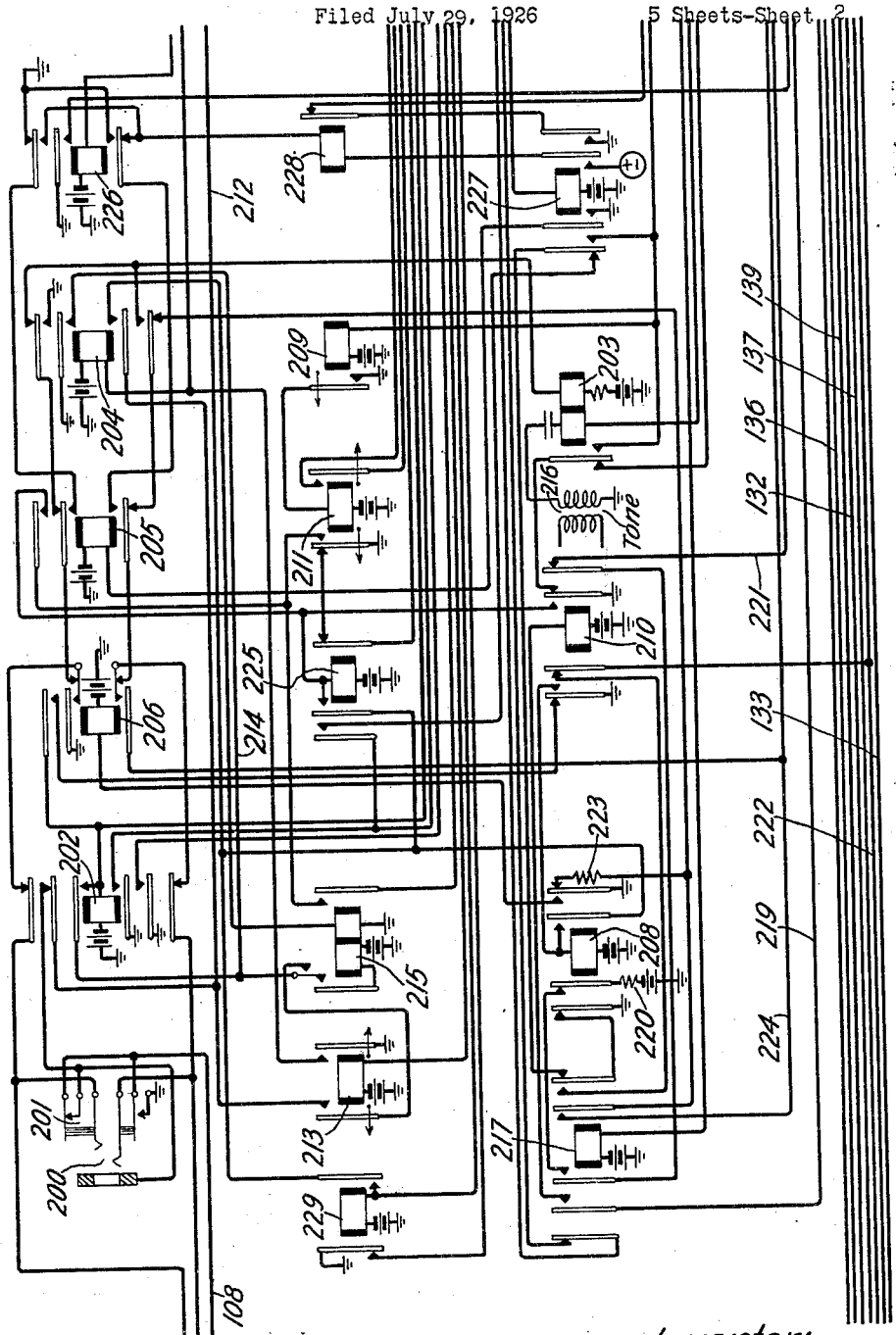
Figs. 2 and 3 show the test line equipped with ringing apparatus and a switch for controlling the tests.
Figure 3:
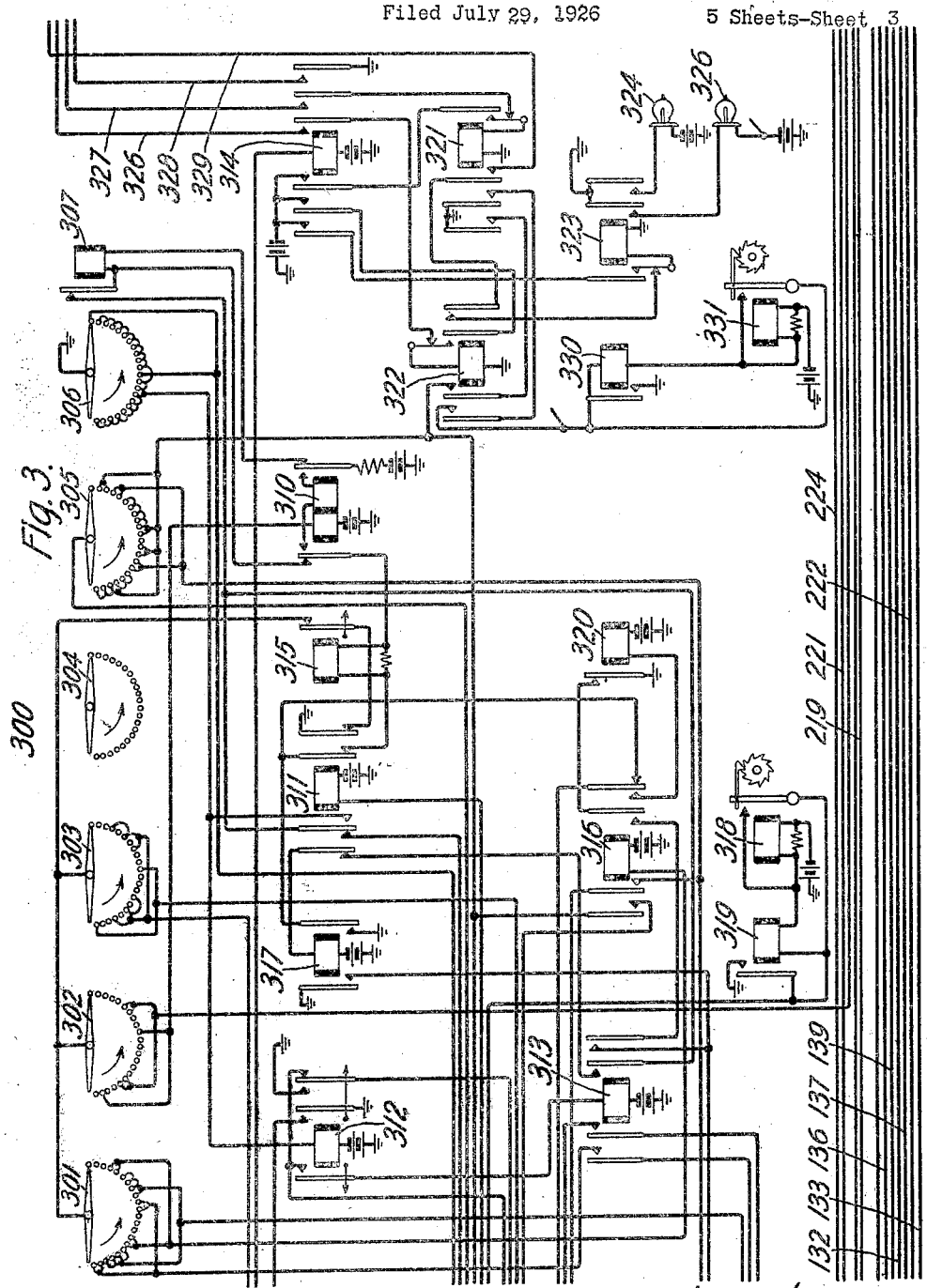

Assuming that the test man desires to test the ringer and the dial of substation 100, he will remove the receiver from the switch hook. The line switch 103 will extend the line to a district selector 104 and a sender 105. The usual dial tone is received whereupon the test man dials a special code provided for such tests. The sender will direct the district selector to the test line, shown in Figs. 2 and 3. When the district selector comes to rest on the test line 106, ground is connected from the district selector to brush 107 to render the test line busy to other district selectors. Following the selection of the test line, the district selector makes the usual test of the outgoing trunk to determine whether it is ready for use. The circuit for this test may be traced from battery, through the right winding of relay 203, upper back contacts of relays 204, 205 and 206, uppermost back contact of relay 202, conductor 109, brush 104, lower contact of cam 111 through the sender 105, upper contact of cam 112, brush 113, conductor 114, lower back contacts of relays 202, 206, 205 and 204, resistance 223, right back contact of relay 208 to ground. Relay 203 does not operate but the sender is advanced in the usual manner causing the district selector to assume the preliminary operator's talking position in which position polarized relay 115 and the right windings of repeating coil 116 are bridged across the tip and ring conductors. The current in the circuit of relay 203 is now sufficiently increased to permit the relay to operate. The operation of relay 203 closes a circuit from battery through the winding of relay 209, front contact of relay 203, inner right back contact of relay 210 to ground. Relay 209 in turn closes an obvious circuit for relay 211. Relay 211 in operating closes a circuit from battery through the right back contact of relay 310, winding and back contact of stepping magnet 307 of switch 300, inner left back contact of relay 311, right front contact of relay 211, normal terminal of brush 306 to ground. Magnet 307 operates stepping switch 300 to position 1.

With switch 300 in position 1, or any other off-normal position, a circuit is closed from battery through the winding of relay 312, off-normal contacts of brush 306 to ground. Thus relay 312 is held operated as long as switch 300 is off-normal. With relay 312 operated, ground is connected to conductor 212 furnishing locking ground for a number of relays as will appear hereinafter. With switch 300 in position 1, relay 229 is also operated in a circuit from battery through the winding of relay 229, brush 303, back contact of relay 315, outer right back contact of relay 311 to ground. Relay 229 locks to ground on conductor 212. A circuit is completed for relay 213 by relay 312 and a circuit prepared for relay 313. Relay 213 in operating closes a circuit for relays 204 and 314. Relay 314 starts a timing operation which will be described hereinafter. Relay 204 connects ground to conductor 214 and reverses the connection of battery and ground to the tip and ring conductors 109 and 114. The circuit now extends from battery through the winding of relay 203, outer lower front contact of relay 204, lower back contact of relay 205, and thus as previously traced through the polarized relay 115, back to the upper back contact of relay 205, outer upper front contact of relay 204 directly to ground. The current in this circuit is in the right direction to operate relay 115.

The operation of relay 115 causes the district selector sequence switch to advance to the operator's talking position, in which the repeating coil is disconnected and a direct talking circuit established. When the district selector arrives in this position, the circuit of relay 203 extends over conductor 109, brush 110, upper right contact of cam 111, upper left contact of cam 117, through the line switch 103 to subscriber's substation 100 back through the line switch 103, lower left contact of cam 118, lower right contact of cam 112, brush 113 to conductor 114, the remaining circuit being as previously traced. The operation of relay 204 prepares a circuit from ground through the right winding of relay 215, inner lower front contact of relay 204, inner upper back contact of relay 202, contact 201 of jack 200, conductor 108 to the terminal engaged by sleeve brush 107. The district selector holds the direct ground on the sleeve brush until it reaches the talking position above described, at which time the direct ground is replaced by battery through the winding of a relay. This relay, not shown, operates and locks in series with relay 215 in turn operating relay 215. Relay 215 locks in a circuit from battery through its left winding and outer left front contact to conductor 214. It also extends ground from conductor 214 over its left front contacts, left front contact of relay 213, inner upper back contact of relay 202, contact 201 of jack 200 to sleeve conductor 108. The operation of relay 215 also completes a circuit for relay 313 which extends over the left front contact of relay 312, right front contact of relay 215 to ground at the left front contact of relay 211. The operation of relay 313 closes a circuit from a source of tone 216, left winding of relay 203, outer left front contact of relay 313, brush 301 in position 1, right back contact of relay 315, outer right back contact of relay 311 to ground. The completion of this circuit induces a tone in the dialing circuit, including relay 203 and the substation, to indicate to the test man that the test line is ready to operate.

In response to this tone the test man will dial a single digit. The particular digit to be dialed depends upon the test which it is desired to make. Dialing 2, 3, 4 or 5 will cause the association of the dial tester circuit with the test line for the purpose of testing the substation dial. Dialing 6 or 7 will prepare the test for testing the substation ringer. The operation of the circuit in response to the dialing of any particular digit will be described hereinafter. When the dial, in returning to normal, first opens the circuit of relay 203 and that relay releases momentarily, the circuit of relay 209 is opened but since relay 209 is slow to release it remains operated for an appreciable interval. Relay 203 in releasing closes a circuit from battery, right back contact of relay 310, winding of stepping magnet 307, left back contact of relay 310, winding of relay 315, inner right back contact of relay 311, right back contact of relay 316, left back contact of relay 217, inner left front contact of relay 313, back contact of relay 203, inner right back contact of relay 210 to ground. A parallel circuit also extends from battery through the winding of relay 317 to the outer left contact of relay 311, inner right front contact of relay 313, back contact of magnet 307 to the operating circuit for magnet 307 above traced. Relays 315 and 317 and magnet 307 operate in these circuits. Relay 317 closes a substitute circuit for relay 209 and a substitute circuit for magnet 307 and relay 315 to insure the continued operation of relays 209 and 315 and the complete operation of magnet 307. When magnet 307 completely attracts its armature it opens the circuit of relay 317 and that relay releasing permits the release of magnet 307 to advance switch 300, controlled thereby, to position 2. This operation is repeated for each release of relay 203, advancing switch 300 one step for each dial pulse.

If, for any reason, the circuit of relay 203 is opened only once, switch 300 will be advanced to position 2 after which relay 315 will release. A circuit will thereupon be closed from battery through the left winding of relay 310, brush 302 in position 2, back contact of relay 315, outer right back contact of relay 311 to ground. Relay 310 operates and prepares a circuit from battery over its right front contact, right winding and left front contact, winding of relay 315 and thence as previously traced to the back contact of relay 203. When relay 203 next releases, the last traced circuit is completed. Relay 315 is operated as above described opening the energizing circuit of relay 310. However, relay 310 is held operated until the completion of the first pulse over the circuit through its right winding. At the completion of the pulse relay 203 reoperates. Relay 315, being slow to release, continues to hold the energizing circuit of relay 310 open, and the reoperation of relay 203 opens the holding circuit of relay 310 so that relay 310 releases. The release of relay 310 restores the circuit of magnet 307 and the remaining pulses cause the operation of the magnet to advance switch 300 to the desired position.

The dialing of any one of the digits 2 to 8 steps switch 300 into a corresponding one of the positions 3 to 9. In position 3 the circuit is arranged to test low speed dials under test limits, in position 4 to test low speed dials under readjust limits, in position 5 to test high speed dials under test limits, and in position 6 to test high speed dials under readjust limits. In position 7 the circuit is arranged to apply ringing current to the ring conductor and in position 8 to apply ringing current to the tip conductor. The circuits are arranged so that, if the ringer test is applied first, the dial test may be applied later without re-establishing the connection to the test line.

*Ringer test.*

Assuming that it is desired to test both ringer and dial, and that substation 100 is (as shown) an individual line, 6 will be dialed and switch 300 advanced to position 7 in the manner described. When the dial returns to normal, relay 315 will release connecting ground to brushes 301, 302 and 303. Over brush 301 a circuit will be completed through the winding of relay 316 to battery. Relay 316 in operating opens the circuit previously traced from the back contact of relay 203 to magnet 307 and extends it over the outer right front contact of relay 316 to the winding of relay 320 and battery. Relay 316 also closes a holding circuit for relay 209 from battery through the winding of relay 209, outer right front contact of relay 313, inner right front contact of relay 316, back contact of relay 320 to ground. Relay 203 remains connected to the tip conductor and ground to the ring conductor.

The test man will now dial any number, preferably a high one, so that there may be a plurality of interruptions of the line circuit to determine whether the ringer responds falsely to dialing. The operations of relay 203 in response to the dial pulses cause operations of relay 320, which takes the place of the stepping magnet. After a short interval the receiver should be restored to the switchhook. This opens the circuit of relay 203 and that relay releases, again completing the circuit of relay 320. Relay 320 remains operated long enough to permit the release of relay 209, which in turn releases relay 211 and relay 313. A circuit is thereupon closed from battery through the winding of relay 227, inner left front contact of relay 316, brush 305, back contact of relay 225, back contact of relay 211 to ground. Relay 227 in operating locks in a circuit through its winding, inner left front contact of relay 316, back contact of relay 228, outer right front contact of relay 227 to ground. Relay 227 also closes a circuit from battery through the winding of relay 209, outer left front contact of relay 227, outer right back contact of relay 217, outer left back contact of relay 208 to ground. The operation of relay 209 recloses the circuit for relay 211 which in turn reoperates relay 313, and in turn reoperates relay 320 whose circuit was opened due to the release of relay 313. The operation of relay 227 also closes an obvious circuit for relay 205. With relay 205 operated, a circuit is closed from battery, through the winding of relay 225, uppermost front contact of relay 205 to ground at the left front contact of relay 211. With relays 227 and 205 operated, ringing current is connected over the inner right front contact of relay 227, through the winding of relay 228, lower back contact of relay 226, lower front contact of relay 205 over the circuit previously traced through the substation back to the inner front contact of relay 205, upper back contact of relay 226, to generator ground. Since the receiver 119 has been restored to the switchhook, ringing current passes through the ringer 101. The response of the ringer 101 to this current may then be noted and any necessary adjustments made.

Following the application of ringing current to the line, receiver 119 will be removed from the switchhook. This increases the flow of current through relay 228 sufficient to operate that relay, opening the locking circuit of relay 227 which releases and removes ringing current from the line. The release of relay 227 in turn releases relay 205 and closes a circuit from battery through the winding of relay 311, outer left front contact of relay 225, outer left back contact of relay 227, right back contact of relay 217 to ground at the left back contact of relay 208. The operation of relay 311 opens the circuit of relay 317, opens the circuit of magnet 307, removes ground from brushes 301, 302 and 303, and connects ground from brush 306 to the back contact and winding of magnet 307, the circuit of which is completed to battery at the back contact of relay 310. The removal of ground from brush 301 releases relay 316 and in turn relay 320. Switch 300 is stepped in the circuit above traced for magnet 307 to its normal position. With relay 205 released, relay 203 is again connected to the ring conductor 114 and operates over the subscriber's loop, holding relay 209 operated. With relay 209 held operated relays 211 and 313 are held operated. When switch 300 reaches normal, relay 312 releases, in turn releasing relays 225, 229, 313 and 311. The release of relay 312 transfers the circuit of relay 213 from direct ground to ground reached through the right contact of relay 215 and the left front contact of relay 211. The continued operation of relay 213 holds relays 204 and 314 operated. The release of relay 311 closes a circuit from ground over brush 306, its normal terminal, right front contact of relay 211, inner left back contact of relay 311, back contact and winding of magnet 307 to battery at the right back contact of relay 310. Magnet 307 steps switch 300 to position 1, in which position, the above traced circuit is opened and relay 312 is reoperated, in turn reoperating relay 313. Relay 229 is operated as before and locks to conductor 212. The dial tone circuit is again closed and the test line is ready to repeat the ringing test or to be used in connection with making a dial test.

Dial test.

Assuming that dial 102 is a low speed dial and that it is to be tested under test limits, the test man will now dial the digit 2 in response to which switch 300 will be advanced to position 3. When the dial returns to normal after the completion of dialing, relay 315, releases connecting ground to brushes 301, 302, and 303. A circuit is thereupon closed from battery, through the winding of relay 217, brush 301 in position 3 to ground. Relay 217 in operating completes a circuit from battery through the winding of relay 210, outer left front contact of relay 217, conductor 219 to the terminal corresponding to the test line of Figs. 2 and 3, appearing in the arc served by brush 406. It also closes a circuit from battery through the resistance 220, inner left back contact of relay 208, inner left front contact of relay 217, outer right contact of relay 210, conductor 221 to the corresponding terminal in the arc served by brush 403. It likewise closes a circuit to ground over the right back contact of relay 208 through resistance 223, inner right front contact of relay 217, conductor 224 to the corresponding terminal in the arc served by brush 401. In addition it closes a circuit from ground over the outer left back contact of relay 208, outer right front contact of relay 217, inner left back contact of relay 210, conductor 222, winding of start relay 410 to battery.

Relay 410 is available also to other ringer test lines in the same group and to connecting circuits at the local test desk. The operation of relay 410 starts the hunting switches of idle dial test circuits hunting for the test line of Figs. 2 and 3 by means of a circuit extending from ground at the front contact of relay 410, contact 411 of jack 412, back contact of relay 501, left back contact of relay 502, conductor 503, back contact of magnet 407, winding of relay 408 to battery. Relay 408 operates and closes a circuit from battery through the winding of magnet 407, front contact of relay 408 to conductor 503. When magnet 407 operates, the circuit of relay 408 is broken and that relay releases in turn opening the circuit of the stepping magnet 407, stepping switch 400 one step. When magnet 407 recloses its back contact, relay 408 reoperates, in turn operating magnet 407 and stepping the switch as before.

When the selector reaches the terminal corresponding to the test line in the arc served by brush 403, the circuit previously traced from battery through resistance 220 is extended over brush 403, contact 413 of jack 412, windings of relays 501 and 504 to ground. Relay 504 operates and closes a shunt around its high resistance left winding permitting the operation of a marginal relay 501. Relay 501 in operating opens the circuit of relay 408 causing selector 400 to come to rest on the terminals associated with the test line. It closes a circuit from battery through the winding of relay 505, front contact of relay 501, contact 411 of jack 412 to ground at the front contact of relay 410. With relay 505 operated circuits are closed from battery through the winding of relay 502, and from battery through the winding of relay 417, contact 416 of jack 412, inner left front contact of relay 505 to ground. The operation of relay 502 further opens the circuit of magnet 407 and relay 408 and closes a link in an all-dial-testers-busy alarm circuit for operating relay 507 and lighting lamp 508. It also closes a path from conductor 414 to relay 506 in substitution for that over the front contact of relay 505, and extends conductor 418 over the outer right front contact of relay 502, outer left back contact of relay 509 to battery through the left winding of relay 510. The operation of relay 417 initiates a timing operation which will be described later.

Relay 510 operates in the circuit above traced through its left winding and closes a circuit from ground through the winding of relay 419, brush 422 of switch 420, and its strapped terminals, front contact of relay 510 to battery. Relay 419 operates and closes a circuit from battery through the winding of relay 430, front contact of relay 419 to ground. Relay 430 operates and connects battery over its front contact to the normal terminal of brush 421 and thence through the winding of relay 431 to ground. Relay 431 operates and connects ground over its front contact to the windings of relays 432 and 511 thus supplying battery and ground to the off-normal conductors.

Relay 502 now locks over its inner left front contact to ground at the right front contact of relay 511. Ground, over the inner left contact of relay 432, completes a circuit extending over the inner left back contact of relay 509, right back contact of relay 512, middle right front contact of relay 502, brush 406, conductor 219 and thence as previously traced through the winding of relay 210 to battery. Relay 210 operates and opens the circuit of start relay 410 bringing other dial test switches to rest. It also disconnects battery from conductor 221 releasing relays 501 and 504 which in turn release relay 505. It likewise closes obvious circuits for relays 225 and 208 which relays lock to ground on conductor 212. Relay 208 in operating opens the start lead in a second place and disconnects battery from conductor 219 in a second place. It also disconnects ground from ring conductor 224. In addition it closes an obvious circuit for relay 206. Relay 206 connects ground to the tip conductor over its inner upper front contact and transfers ring conductor 114 from the winding of relay 203 to the winding of relay 510, thus releasing relay 203. The operation of relay 210 further releases relay 209 which in turn releases relay 211 and relay 313. The circuit is now under the control of the dial test circuit which is held over the subscriber's loop.

The operation of relay 505, previously described, connected ground to the windings of relays 513 and 514 in series over conductor 560. Relay 513 connects a substitute ground to conductor 560. When register 514 completely attracts its armatures, it connects ground from conductor 560 to the second terminal of relay 513 and that relay releases. When relay 505 is deenergized, ground was removed from conductor 560 and the register magnet released, having registered a test thereon. The purpose of relay 513 is to insure a complete registration if relay 505 remains operated for only a very short time.

With relay 511 operated, as previously described, it will close a circuit from battery over its outer left front contact, outer right contact of relay 509, normal terminal of brush 423, back contact of stepping magnet 427, winding of relay 428 to ground. Relay 428 operates in this circuit and connects battery over its left contact through the windings of relay 439 and magnet 427 to ground. Magnet 427 operates and attracts its armature at which time it opens a circuit of relay 428. The release of relay 428 opens the circuit for magnet 427 and that magnet retracts its armature, stepping switch 420 to position 1. Relay 511 likewise closes a circuit from battery over its outer left contact, winding relay 515 to ground over contact 516 closed by resetting arm 517 in its position of rest. The operation of relay 517 is ineffective at this time.

With switch 420 in position 1, a circuit is closed from battery through the winding of relay 522, brush 424 in position 1 to ground. Relay 522 locks over its right contact, left back contact of relay 523, to ground at the right front contact of relay 511. Relay 522 likewise closes an obvious circuit through the right winding of relay 524. Relay 524 closes a holding circuit from battery at the front contact of relay 510, inner right front contact and left winding of relay 524, contact 529 of key 530, winding of holding magnet 531 to ground. It also closes a circuit from battery over its right contact, brush 423 in position 1, back contact of magnet 427, winding of relay 428 to ground. Relay 428 and magnet 427 cooperate to step switch 420 to position 2.

With switch 420 in position 2 a circuit is closed from ground over brush 424, winding of relay 525 to battery. Relay 525 in operating extends battery over its front contact, winding of resetting magnet 526 to ground. With magnet 526 energized, resetting arm 517 is moved to the left. As it leaves its extreme right position, it opens contact 516 which releases relay 515. Projections on arm 517 engage pendulum arm 527 and trip arm 528, and carry these arms to their extreme left position where the pendulum arm is brought under the control of magnet 531 which has already been energized. When arm 517 reaches its extreme left position, it closes contact 532 which completes an obvious circuit for relay 533. Relay 533 operates and closes a holding circuit for itself from ground over arm 527, through the winding of trip magnet 534, contact 535 of key 530, right winding of relay 533, inner left front contact of relay 533, back contact of relay 536, inner right front contact of relay 511 to battery. Magnet 534 is energized and holds arm 528 in its proper position with respect to the pendulum arm 527. Relay 533 likewise closes a circuit from ground through the winding of relay 537 to battery. Relay 533 also closes a circuit from battery through the winding of relay 539, right back contact of relay 538, outer left contact of relay 533 to ground at the outer left contact of relay 432. When relay 537 was operated as above described, it connected battery over its outer right front contact to brush 423 in position 2 and thence to relay 428. Relay 428 causes the advance of switch 420 to position 3 in the manner previously described.

With switch 420 in position 3, the operating circuit of relay 525 is opened and that relay releases in turn releasing magnet 526. Arm 517 now swings back to the right, leaving the pendulum under the control of magnet 531, and the trip arm is held in position by magnet 534. As arm 517 leaves its right-hand position the circuit through the left winding of relay 533 is opened and that relay remains held up in series with the trip magnet 534. When arm 517 reaches its left-hand position, the circuit previously traced through the winding of relay 515 is again closed. Relay 515 in operating connects ground over its left contact to brush 423 in position 3, advancing switch 420 to position 4. It also connects battery over its right contact to one side of the windings of relays 518, 519 and 520, preparing these relays for operation later.

With switch 420 in position 4, a circuit is closed from battery over the left contact of relay 524, brush 422 in position 4, winding of relay 419 to ground, holding that relay operated. A circuit is also closed from battery through the winding of relay 523, brush 424 in position 4 to ground. Relay 523 in operating closes a circuit from battery through the winding of relay 433, left contact of relay 540, back contact of relay 541, inner right contact of relay 509, outer right front contact of relay 523 to ground. Relay 433 locks in a circuit which may be traced as previously described to the back contact of relay 509 and extends thence over the outer right front contact of relay 433 to ground at the outer left front contact of relay 432. Relay 523 also opens a locked circuit of relay 522 and that relay releases in turn opening the operating circuit of relay 524. Relay 524 is held as previously described in circuit with magnet 531. A circuit is now closed through tone source 542, condenser 543, back contacts of relays 520, 519 and 518, left winding of relay 510, inner right front contact of relay 433, and outer left front contact of relay 523 to ground at the right front contact of relay 511. The tone from this circuit is induced from the right winding of relay 510 into the subscriber's substation receiver informing the test man that the dial test circuit is now ready for operation. Relay 433 also places magnet 427 under the control of relay 510, the circuit being traceable from battery over the back contact of relay 510, inner left front contact of relay 433, back contact of relay 434, winding of relay 429, winding of magnet 427 to ground, and in parallel therewith, over the middle left contact of relay 433, back contact of magnet 427, winding of relay 428 to ground. The circuit in this form is similar to the usual dialing circuit used in sender operation; relay 428 supplying a battery to hold magnet 427 operated until it shall completely attract its armature.

In response to the tone received at this time, the test man will now dial zero which corresponds to ten pulses. Each time that the dial opens the circuit of relay 510, that relay releases and completes the circuit described for magnet 427, stepping switch 420 one step. On the first release of relay 510, the holding circuit for relay 524 and magnet 531 is opened and pendulum 527 is permitted to swing under the force of gravity. When switch 420 leaves position 4, the circuit for relay 523, above traced, is opened and the tone disconnected. When switch 420 reaches position 12 following the 8th pulse, a circuit is closed from ground through the winding of relay 419, brush 422 in position 12, front contact of relay 539, middle front contact of relay 537 to battery. A circuit is also closed through the winding of relay 538, brush 424 in position 12 to ground. Relay 538 locks over its inner right front contact, outer left front contact of relay 533 to ground at the outer right front contact of relay 432. The operation of relay 538 opens the circuit of relay 539 but that relay, being slow to release, holds relay 419 operated while switch 420 is in position 12. Relay 538 in operating closes a second holding circuit for relay 533 over the outer front contact of relay 538, inner right back contact of relay 523, inner right front contact of relay 537 to battery at the front contact of relay 510. When switch 420 reaches position 13, relay 419 is held operated over brush 422 and the middle right front contact of relay 537 to battery. A circuit is closed from battery at the inner left front contact of relay 511 through the winding of relay 536, brush 424 in position 13 to ground. Relay 536 in operating opens the first locking circuit of relay 533, leaving that relay under the control of relay 510. When relay 510 releases at the beginning of the 10th pulse, relay 533 is released as well as trip magnet 534. The release of magnet 534 permits arm 528 to make contact with one of the segments of strip 521. Arm 528 makes a frictional contact as well as an electrical contact with the segment, and remains in the position in which it was released. The release of relay 533 opens the locking circuit of relay 538 and that relay releases preventing the re-establishing of the circuit of magnet 534. The release of relay 533 also opens the circuit of relay 537 and the holding circuit of relay 419 is now returned to the control of relay 510. The segments of strip 521, numbered 550 to 558, are connected to the contacts of relays 518, 519 and 520. Assuming that the contact of arm 528 comes to rest on segment 554, a circuit would be closed from ground over arm 528, segment 554, inner right back contact of relay 506, winding of relay 518, left front contact of relay 515 to battery. Relay 518 operates in this circuit.

When switch 420 comes to rest in position 14, following the last pulse, a circuit is closed from battery through the winding of relay 523, brush 424 in position 14 to ground. The operation of relay 523 completes a circuit from source of tone 542, condenser 543, interrupter 544, front contact of relay 518, left winding of relay 510, outer left front contact of relay 523 to ground at the outer right contact of relay 511. This tone induces current in the left winding of relay 510 and thence to the receiver of the subscriber's substation. Interrupter 544 operates at high speed so that dialing tone from source 542 is interrupted repeatedly to indicate to the test man that the pulsing was too fast.

Repeat dial test.

The test man will now readjust the dial and then wish to test it again. In order to repeat the test, he may now dial one of the single digits 2 to 5. Dialing 2 or 4 will permit the repeated test to be made under test conditions, whereas dialing 3 or 5 will repeat the test under readjust conditions. Assuming that it is desired to test under readjust conditions, the test man will now dial three. Relay 510 will be released three times and switch 420 will be advanced to position 17. With switch 420 in position 17 ground is connected over brush 424 to the winding of relay 541, back contact of relay 429 to battery. Relay 541 in operating releases relay 433 and closes a circuit from ground over its right contact, left back contact of relay 512, left back contact of relay 506, winding of relay 545 to battery. Relay 545 locks in a circuit extending over the back contact of relay 506, left back contact of relay 512, inner upper contact of relay 545, left back contact of relay 540 to ground at the outer left front contact of relay 432. The release of relay 433 connects battery over its left back contact to terminals 5 to 21 of brush 423. A circuit is therefore completed, extending over brush 423, back contact of magnet 427, winding of relay 428 to ground, in which circuit, switch 420 is restored to normal. Relay 523 is released, cutting off the tone as soon as switch 420 leaves position 14.

When switch 420 reaches position 20, a circuit is closed from battery through the winding of relay 434, brush 424 to ground. Relay 434 locks over its left contact, right front contact of relay 515, to ground at the outer left contact of relay 432. When switch 420 reaches normal, a circuit is closed from ground through the winding of relay 431, brush 421 normal, right front contact of relay 430 to battery. Relays 432 and 511 are therefore held operated at this time since relay 510 is still operated and relay 419 is maintained operated.

The advance of test circuit to position 4 is the same as previously described. The test man will, upon receiving the dial tone, dial zero as before and the pendulum will register the point reached at the end of the 10 pulses. If upon the release of arm 528 it now makes contact with segment 556, a circuit extends from ground over arm 528, segment 556, outer right back contact of relay 506, winding of relay 519 to battery at the front contact of relay 515. The operation of relay 519 indicates that the dial is correctly adjusted even under readjust conditions. On the operation of relay 523, a circuit is closed from source of ringing current 547 through lamp 548, condenser 549, front contact of relay 519, back contact of relay 518 and thence as previously traced to ground.

It may be noted at this time that ringing current is used to indicate a dial whose speed is correct, whereas interrupted dial tone is employed to indicate a dial whose speed is incorrect.

Release of dial tester and test line.

Assuming that the test has been completed to the satisfaction of the test man, he will now restore the receiver to the switchhook. The circuit of relay 510 is opened, and that relay releases in turn releasing the relay 419. Relay 419 opens the circuit of relay 430, which closes at its right back contact a circuit from ground over the right front contact of relay 432, right back contact of relay 430, winding of relay 509 to battery. Relay 509 locks over its inner right front contact to ground at the inner left front contact of relay 432. The operation of relay 509 disconnects ground from brush 406, permitting the restoration of the test line as will be described later. It also opens the circuit of relay 433. The release of relay 433 connects battery to terminals 5 to 21 of brush 423 completing the circuit for the restoration of switch 420 to normal. When switch 420 reaches normal with relay 419 released, relay 431 releases, in turn releasing relays 432 and 511. Subsequently relays 509, 502 and 417 are released and the circuit is ready for use in connection with another test.

The disconnection of ground from brush 406 releases relay 210 in the test line. With relay 210 released a circuit is closed from battery to the winding of relay 202, outer upper front contact of relay 206 to ground at the outer right back contact of relay 210. Relay 202 locks over its inner upper front contact to ground at the inner upper front contact of relay 204. It opens the tip, ring, and sleeve conductors from the district selector and permits the selector to restore to normal. It closes a circuit for register 318 and relay 319, which operate in the same manner as register 514 and relay 513 to register one ringing test. It also closes an obvious circuit for relay 311 which relay opens the circuit of relays 317 and 315 and removes ground from brushes 301, 302, and 303, resulting in the release of relay 217. A circuit is also closed from battery over the right back contact of relay 310, winding and back contact of magnet 307, inner left front contact of relay 311, off-normal terminals of brush 306 to ground. Switch 300 is stepped to normal in this circuit. When switch 300 reaches normal, relay 312 is released in turn releasing relays 225, 208 and 213 which in turn release relays 206, 204 and 215, and finally 202. Relay 202 in releasing opens the circuit of relay 311 and the test line is ready for use with another test. Relay 202 is held operated until the last, in order to avoid interference with the district selector while it is returning to normal.

Ringer test—two party line.

In the case of two-party lines the substation ringer is connected between either the tip or the ring conductor and ground. Ringing current is therefore applied to the ring conductor to signal one party and to the tip conductor to signal the other party. The test man will of course, know to which conductor the ringer of the sub-station which he is testing is connected. For individual lines and those party lines having the ringer connected to the ring conductor the operation will be as above described. In the case of the party whose ringer is connected to the tip conductor the test man will dial 7 which will bring the switch 300 to rest in position 8. A circuit is completed in this position extending from battery through the winding of relay 226, brush 303 in position 8, back contact of relay 315, outer right contact of relay 311 to ground. Relay 226 operates and transfers the circuit of ringing current from the ring conductor to the tip conductor and of generator ground from the tip conductor to the ring conductor. With this exception the operation is the same as above described.

When ground is removed from brushes 301, 302 and 303, relay 226 releases.

Release of test line.

If it is desired to test only the ringer the test man will restore the receiver to the switchhook following its removal to trip the ringing. At this time the switch 300 may be in position 8, 9 or 10 if sufficient time has not elapsed following the removal of the receiver to advance switch 300 to position 1 as previously described. If when the switch returns to normal relay 203 is deenergized no circuit will be provided for relay 209 and in turn relays 211 and 313 will be released. Relay 213 will also be released as well as relays 204 and 314. As in the case of disconnection after dial test, relay 202 will be held operated until the last to permit the district selector to restore. If switch 300 has reached position 1 the restoration will be as described below, under Abandonment of test.

Abandonment of test.

If the test man should abandon the test with switch 300 in position 1, 2, 3, 4, 5, 6, 9 or 10, relay 203 will of course be released. A circuit will be closed from ground at the inner right back contact of relay 210, back contact of relay 203, inner left contact of relay 313, left back contact of relay 217, right back contact of relay 316, inner right contact of relay 311, through the winding of relay 315, left back contact of relay 310, winding of magnet 307 to battery at the right back contact of relay 310. Relay 315 will operate and will remove ground from brushes 301, 302 and 303. Relay 209 will be released. The release of relay 209 releases relay 211 in turn releasing relay 313. The release of relay 211 completes a circuit from battery through the winding of relay 202, brush 305 in positions 1, 2, 3, 4, 5, 6, 9 and 10, back contact of relay 225, back contact of relay 211 to ground. Relay 202 operates and locks as previously described and the further restoration of circuit is under the control of that relay. With switch 300 in position 7 or 8 which are the ringer test positions it is necessary to complete the test in order to release the test line.

*Automatic release.*

Means are provided for automatically releasing the test line if the test man fails to release it within a reasonable length of time. The operation of relay 314 in parallel with relay 202 extends the circuit of relays 322 and 321 to conductors 326 and 327 respectively, which conductors are extended to terminals served by brush 441 of the timing switch 440. It also supplies locking battery for relays 321, 322 and 323. In addition it connects ground to conductor 328. When, following the operation of relay 314, interrupter 438 closes its upper contact, a circuit is closed from the battery through the winding of relay 436 to conductor 328. Relay 436 in operating connects battery over its front contact to brush 441 and the terminal on which that brush is resting. When interrupter 438 closes its lower contact it completes a circuit from battery through the winding of relay 437 to conductor 328. Relay 437 connects ground over its left contact to conductor 328 holding itself operated as long as interrupter 438 closes its lower contact thus rendering it independent of relay 314 until the interrupter breaks the circuit. Relay 437 also closes a circuit for magnet 443 which controls the operation of switch 440. When the interrupter opens its contact relay 437 releases, magnet 443 releases and switch 440 is advanced one step. Switch 440 will continue to advance in this manner as long as relay 314 remains operated. A second circuit is provided for relay 437 over the back contact of magnet 443 to ground over brush 442 which circuit makes the advance of switch 440 over desired terminals independent of relay 314. When brush 441 reaches terminal 1 battery will be connected over brush 441 to conductor 327 and thence over the middle right contact of relay 314, normal contact and winding of relay 321 to ground. Relay 321 operates and locks over its alternate contact to battery at the inner left contact of relay 314. When brush 441 reaches terminal 7 battery is connected through brush 441 to conductor 326, inner right contact of relay 314, normal contact and winding of relay 322 to ground. Relay 322 also locks under the control of relay 314. If relay 314 continues to be operated for a sufficient length of time battery will be connected over brush 441 to conductor 329 and thence over the inner left front contact of relay 321, inner right front contact of relay 322, normal contact and winding of relay 323 to ground. Relay 323 operates and locks to the outer right contact of relay 314. With relays 331 and 322 both operated a circuit is closed from ground over the middle contact of relay 321, outer contact of relay 322 to the windings of relay 330 and register 331. This relay and register operate in the same manner as relay 513 and register 514 which were described above and serve to record a case of trouble. A circuit is also closed from ground at the outer contact of relay 321, inner contact of relay 322 to the winding of relay 202. As in cases previously described the operation of relay 202 initiates the release of the test line and the district selector. Should the line fail to release before the operation of relay 323, lamp 324 at the relay rack adjacent the test line and also lamp 326 at the trouble desk will be lighted.

This timing circuit also serves the dial tester. Relay 417 is operated as above described in parallel with relay 502 and in a manner similar to relay 314 prepares circuits for relay 444 to conductor 327, relay 439 to conductor 326. It likewise connects ground to interrupter 438 by way of conductor 328. The advance of the timing switch 440 is the same as described. When battery is connected over brush 441 to conductor 327 relay 444 is operated and locks to the outer right contact of relay 417. When battery is connected to conductor 326 relay 439 is operated and locks the middle right contact of relay 417. If the test line is not released in the manner above described by the operation of relays 321 and 322, which takes place at the same time as the operation of relays 444 and 439, a circuit will be closed at a later time from ground through the winding and normal contact of relay 445, front contact of relay 439, front contact of relay 444 to conductor 329 and thence over brush 441 to battery. A circuit will thereupon be closed over the front contacts of relay 445 for lighting lamp 443 at the relay rack adjacent the dial tester and lamp 437 at the trouble desk.

The test line is also arranged to release if the battery supply should be cut off for any reason. The removal of the battery supply would cause all relays to release. When the battery supply is restored, switch 300 being off normal, relay 312 will be operated in turn operating relay 213 and relay 204. The district selector will restore automatically on the removal of ground from the sleeve conductor due to the release of relay 215. With switch 300 in any position but 7 or 8 the circuit previously traced for relay 202 will be completed and that relay will cause the restoration of the line to normal. With switch 300 in position 7 or 8 a circuit will be closed from ground over the back contacts of relays 311 and 315, brush 301 in position 7 or 8, winding of relay 316 to battery. The operation of relay 316 closes a circuit from battery through the winding of relay 202, outer left front contact of relay 316 to ground at the back contact of relay 229. As before, relay 202 causes the restoration of the circuit.

*Manual control of dial tester.*

If it is desired to test the dial of the subscriber's sub-station in connection with some other test necessarily made from the local test desk, a dial tester may be associated with the subscriber's sub-station by the operation of dial test key 120 forming a part of the secondary test cord at the trouble desk. The operation of key 120 connects ground over contact 121, left back contact of relay 130, conductor 222, winding of relay 410 to battery. Relay 410 will cause all idle dial tester switches under its control to start hunting for this test line which appears in terminals of switch 400. The operation of key 120 also closes a circuit from battery through resistance 131, right back contact of relay 130, contact 122, of key 120, conductor 132 to the terminal corresponding to the test cord in the arc served by brush 403. It also prepares a circuit from ground through the winding of relay 130, contact 123 of key 120, conductor 133 to the corresponding terminal in the arc served by brush 402. It also prepares a high efficiency monitoring circuit to the operator's telephone circuit 134. When switch 400 makes contact with the terminals leading to the test cord of Fig. 1, a circuit is completed from battery connected to brush 403 as above described through the windings of relays 501 and 504 to ground. These relays operate in turn operating relay 505. Relay 417 is operated in parallel with relay 502. The operation of relay 417 completes a circuit from battery through the winding of relay 512, outer right front contact of relay 514, brush 402, conductor 133, contact 123 of key 120, winding of relay 130 to ground. Relays 512 and 130 operate in this circuit, relay 130 opening the circuit of start relay 410 and bringing the remaining dial tester switches to rest and also removing battery from conductor 132 to permit the release of relays 501 and 504. Relay 512 provides locking ground at its inner right contact for relay 502 and opens the locking circuit for relays 545 and 546.

The operation of any one of the keys 126, 127, 128 or 129 will set up the desired testing conditions at the dial tester circuit. Key 126 corresponds to a low speed dial tested under test conditions; key 127 to a low speed dial under readjust conditions; key 128 to a high speed dial under test conditions; and key 129 to a high speed dial under readjust conditions. The operation of any one of these keys connects ground over the subscriber's sub-station back to the ring conductor 135 thus operating relay 510. With either key 128 or 129 operated ground is connected over conductor 136, brush 404, conductor 414, inner right contact of relay 502 to the winding of relay 506 to indicate that a high speed dial is being tested. With either key 127 or 129 operated ground is connected to conductor 137, brush 405, conductor 415, outer right contact of relay 512 to the inner right armature of relay 506 and thence to the winding of relay 545 or relay 546 depending on whether relay 506 is released or operated. The keys 126 to 129 remain operated throughout the test. Hence relays 506, 545 or 546 remain in the same condition throughout the test.

The operation of the tester proceeds in the manner previously described. When relay 523 is operated with switch 420 in position 4 a circuit is closed from ground through the winding of relay 138, conductor 139, brush 406, middle right contact of relay 502, outer right front contact of relay 512, inner right contact of relay 523, outer right front contact of relay 524 to battery. This completes the monitoring circuit above referred to so that the operator at the test cord may hear the dial tone as well as the test man at the sub-station. When relay 524 releases following the first dial pulse the above traced circuit is opened and the monitoring circuit is opened in turn to prevent the noise of dialing being heard by the attendant at the test desk and also to prevent interference with the dialing. In position 14, at which time the characteristic tone is transmitted, the circuit of relay 138 is again closed, this time over the back contact of relay 537 so that the tone is also heard at the test desk.

Following the dial test the circuit may be restored to normal by restoring the test key or by restoring the receiver to the switchhook momentarily. In either case relay 510 will be released, in turn releasing relay 419 and relay 430. Relay 430 released will operate relay 509. With relay 509 operated switch 420 is restored to normal. During the restoration of the switch the circuit of relay 138 is opened to prevent noises in the test desk receiver. With the test key released the relays 506, 545 and 546 which impose the test conditions will be released. Since key 120 has not been restored the dial tester will not be released by the restoration of the test key or the receiver. If now it is desired to repeat the test the receiver may be removed from the switchhook or the same or a different test key operated. The operations will proceed as previously described. In order to release the dial tester, key 126 will be restored releasing relay 512 and in turn relays 502 and 417.

If dial test key 120 is restored before any of the test keys is operated, relay 510 will not be operated and switch 420 will not be advanced from normal. The restoration of key 120 will therefore restore relay 512 and in turn relays 502 and 417, leaving the circuit normal. If the test has advanced so that switch 420 is in position 1, 2 or 3, the restoration of the operated test key or of the receiver to the switchhook will release relay 510 in turn releasing relays 419 and 430. A circuit will thereupon be closed from battery, through the winding of relay 509, left back contact of relay 430, left front contact of relay 432 to ground. Relay 509 locks over its inner left front contact to ground at the inner right front contact of relay 432. It also opens the circuit of relay 433. Switch 420 will advance to position 4 in the usual manner but on arriving in position 4, relay 433 will not be operated. A circuit will therefore be closed from battery over the left back contact of relay 433, terminals 5 to 21 of brush 423, back contact of magnet 427, winding of relay 428 to ground and switch 420 will be restored to normal under the control of relay 428. Relay 512 remains operated until dial test key 120 is restored.

If the test key or receiver is restored with switch 420 in position 4, relay 510 will release and energize stepping magnet 427. Relay 524 will release in turn releasing relay 419 and relay 430. Relay 509 is now operated, opening the circuit of relay 433 and permitting the advance of switch 420 to normal. As before relay 512 is held operated under the control of key 120.

If instead of dialing zero any digit from 1 to 7 is dialed, switch 420 will be moved to one of the positions 5 to 11. If now the test key is restored relays 510, 419 and 430 release and relay 509 is operated in the manner described. Relay 509 restores switch 420 to normal as before. If 8 is dialed switch 420 will stop in position 12. In this position relay 419 is under the control of relay 539 but the circuit of relay 539 is opened by the operation of relay 538 and releases after an interval. When the pendulum reaches the end of its swing, the operation of the pendulum arm opens contact 535 mechanically and relay 533 is released in turn releasing relay 537. With relay 537 released the circuit of relay 419 is extended to the front contact of relay 510. If now the receiver is restored relay 510 operates releasing relay 419 and the release takes place as before described. If the receiver is restored before the pendulum completes its swing release will take place immediately in the manner described. If the digit 9 is dialed, switch 420 will stop in position 13. Relay 419 is under the control of relay 537 and the pendulum will release relay 533 and relay 537 as just described, the subsequent release also being the same as described.

In any event it is necessary to restore the test key in order to completely release the dial tester. It therefore is possible if the test man erroneously dials some digit other than zero for him to cause the restoration of switch 420 to normal and make a new test without the assistance of the operator at the trouble desk or without having to have the circuit reestablished. When the dial tester is in use in connection with the test line the wiping out of an erroneous test or the abandonment of the test takes place in somewhat the same manner as that just described in connection with a test cord. However, it is not possible to repeat the test if the wrong number has been dialed without reestablishing the connection.

What is claimed is:

1. In a testing system for testing impulse transmitters and ringers, included in subscribers' station apparatus associated with a central office, testing equipment at said central office, and automatic means for associating a subscriber's station with said testing equipment, said testing equipment comprising means controlled from said station to test the ringer and dial at said station.

2. In a testing system for testing dials and ringers included in subscribers' station apparatus associated with a central office, testing equipment at said central office, and automatic means for associating a subscriber's station with said testing equipment, said testing equipment comprising means controlled from said station to test the ringer at said station and to apply a variety of speed tests to the dial at said station.

3. In a testing system for testing dials and ringers included in subscribers' station apparatus associated with a central office, testing equipment at said central office, automatic means for associating the subscriber's station with said testing equipment, said testing equipment comprising means controlled from said station to test the ringer at said station, and means to determine the limits under which the dial at said station is to be tested.

4. In a testing system for testing dials and ringers included in subscribers' station apparatus associated with the central office, testing equipment at said central office, automatic means for associating the subscriber's station with said testing equipment, a multiposition switch in said testing equipment, means controlled from said station to position said switch, means operated in certain positions of said switch to apply a test to the ringer at said station, and means operated in other positions of said switch to test the dial at said station.

5. In a testing system for testing dials and ringers included in subscribers' station apparatus associated with the central office, testing equipment at said central office, a dial tester therein, automatic means for associating a subscriber's station with said testing equipment, a multiposition switch in said testing equipment, means controlled from said station to position said switch, means operated in certain positions of said switch to apply a test to the ringer at said station, and means operated at other positions of said switch to associate said dial tester with said station.

6. In a testing system for testing dials and ringers included in subscribers' station apparatus associated with a central office, testing equipment at said central office, a dial tester therein, automatic means for associating a subscriber's station with said testing equipment, a multiposition switch in said testing equipment, means controlled from said station to position said switch, means operated in certain positions of said switch to apply a test to the ringer at said station, means operated at other positions of said switch to associate said dial tester with said station, and other means operated in accordance with the position of said switch to determine the limits under which the dial at said station is to be tested.

7. In a testing system for testing dials and ringers included in subscribers' station apparatus associated with a central office, testing equipment at said central office, a plurality of dial testers therein, automatic means for associating a subscriber's station with said testing equipment, a multiposition switch in said testing equipment, means controlled from said station to position said switch, means operated in certain positions of said switch to apply a test to the ringer at said station, and means operated at other positions of said switch to associate one of said dial testers with said station.

8. In a testing system for testing dials and ringers included in subscribers' station apparatus associated with a central office, testing equipment at said central office, a plurality of dial testers therein, automatic means for associating a subscriber's station with said testing equipment, a multiposition switch in said testing equipment, means controlled from said station to position said switch, means operated in certain positions of said switch to apply a test to the ringer at said station, means operated at other positions of said switch to associate one of said dial testers with said station, and other means operated in accordance with the position of said switch to determine the limits under which the dial at said station is to be tested.

9. In a testing system for testing ringers at subscribers' station apparatus associated with a central office, testing equipment at said central office, means controllable from a subscriber's station for associating said station with said testing equipment, a ringing current source, means to automatically associate and disassociate said ringing current source with said ringer to test the operation of said ringer, another current source, means to test said ringer for false operation from said last current source, and means to prevent the association of said ringing current source with said ringer during said latter test.

10. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means in said testing equipment controlled from said station to test the dial at said station and means operative following said ringer test to arrange said testing equipment for subscribers' station control to make a repeat of said ringer test or make said dial test.

11. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means to control the association of one of said dial testers with said station, means to control the application of impulsing speed tests to the dial at said station by said dial tester, and means effective following the testing of the ringer at said station to restore said testing equipment to a condition in which said equipment may be operated to perform another ringer test or to control a dial test.

12. In a testing system for testing dials and ringers included in subscribers' station apparatus associated with a central office, testing equipment at said central office, dial testers therein, means for associating a subscriber's station with said testing equipment, a multi-position switch in said testing equipment, means controlled from said station to position said switch, means operated in certain positions of said switch to apply a test to the ringer at said station, means operated in other positions of said switch to control the association of one of said dial testers with said station, other means operated in accordance with the position of said switch to control the limits under which the dial at said station is to be tested, and means effective in the positions of said switch in which ringer tests are made to restore said switch and to permit reoperation of said switch to perform the same or another test.

13. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means to control the association of one of said dial testers with said station, means to control the application of impulsing speed tests to the dial at said station by said dial tester, means operable following the dial test to place the testing equipment in condition to make another dial test, and means operable following a ringer test to place the testing equipment in condition to make another ringer test or to make a dial test.

14. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means to control the association of one of said dial testers with said station, means to control the application of impulsing speed tests to the dial at said station by said dial tester, and means in said testing equipment operated after a measured length of time to restore said testing equipment to normal and disconnect it from said station.

15. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means to control the association of one of said dial testers with said station, means to control the application of impulsing speed tests to the dial at said station by said dial tester, and means in said testing equipment operated after a measured length of time to restore said testing equipment to normal, to restore said dial tester to normal and to disconnect said testing equipment and said dial tester from said station.

16. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means to control the association of one of said dial testers with said station, means to control the application of impulsing speed tests to the dial at said station by said dial tester, means in said testing equipment operated after a measured length of time to restore said testing equipment to normal and disconnect it from said station, a signal, and means for operating said signal if said testing equipment does not become normal within a predetermined length of time thereafter.

17. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means to control the association of one of said dial testers with said station, means to control the application of impulsing speed tests to the dial at said station by said dial tester, means in said testing equipment operated after a measured length of time to restore said testing equipment to normal, to restore said dial tester to normal and to disconnect said testing equipment and said dial tester from said station, a signal, and means for operating said signal if said dial tester does not become normal within a predetermined length of time thereafter.

18. In a testing system for testing dials and ringers included in subscribers' station apparatus associated with a central office, testing equipment at said central office, dial testers therein, means for associating a subscriber's station with said testing equipment, means in said testing equipment controlled from said station to test the ringer at said station, means to control the association of one of said dial testers with said station, means to control the application of impulsing speed tests to the dial at said station by said dial tester, means in said testing equipment operated after a measured length of time to restore said testing equipment to normal, to restore said dial tester to normal and to disconnect said testing equipment and said dial tester from said station, a signal individual to said testing equipment and a signal individual to said dial tester, and means for operating the corresponding signal if either said testing equipment or said dial tester fails to become normal within a predetermined length of time following the operation of said restoring means.

19. In a testing system for testing dials at subscribers' station apparatus associated with a central office, a dial tester at said central office, means to associate said dial tester with a subscriber's station controllable from said station, other means to associate said dial tester with said station controllable through an operator's position, and means in said dial tester to render said dial tester responsive to control from said station or from said operator's position.

20. In a testing system for testing dials at subscribers' station apparatus associated with a central office, a dial tester at said central office, means to associate said dial tester with a subscriber's station controllable from said station, other means to associate said dial tester with said station controllable through an operator's position, means in said dial tester to render said dial tester responsive to control from said station or from said operator's position, and means controlled in one manner from said station and in another manner from said operator's position to place said dial tester in condition to repeat the test.

In witness whereof, I hereunto subscribe my name this 27th day of July, A. D., 1926.

GEORGE RIGGS.